(12) United States Patent
Fragstein

(10) Patent No.: US 6,256,969 B1
(45) Date of Patent: Jul. 10, 2001

(54) WRAPPING MACHINE WITH SEALING JAW ASSEMBLY FOR BALED PRODUCTS AND PACKAGES

(75) Inventor: Karl H. Fragstein, Orange, TX (US)

(73) Assignee: Karltex Machine, Inc., Orange, TX (US)

( * ) Notice: Subject to any disclaimer, the term of this patent is extended or adjusted under 35 U.S.C. 154(b) by 0 days.

(21) Appl. No.: 09/293,186

(22) Filed: Apr. 16, 1999

(51) Int. Cl.[7] .............................. B65B 9/02; B65B 51/30
(52) U.S. Cl. .................. 53/553; 53/374.8; 156/583.1
(58) Field of Search .................. 53/553, 555, 374.8, 53/371.8; 156/583.1; 219/243

(56) References Cited

U.S. PATENT DOCUMENTS

| | | | |
|---|---|---|---|
| 2,596,933 | * | 5/1952 | Kirk ........................ 219/243 |
| 2,785,729 | * | 3/1957 | Smith et al. ............... 219/243 |
| 2,928,217 | * | 3/1960 | Case et al. ................. 53/553 |
| 3,078,201 | * | 2/1963 | Christie ................. 156/583.1 |
| 3,191,356 | * | 6/1965 | Zelnick ................... 53/374.8 |
| 3,490,194 | * | 1/1970 | Monaghan ............... 53/374.8 |
| 3,643,397 | * | 2/1972 | Bahnsen ..................... 53/553 |
| 3,748,811 | * | 7/1973 | Cox .......................... 53/553 |
| 3,782,072 | * | 1/1974 | Sorensen ..................... 53/553 |
| 3,982,991 | * | 9/1976 | Hamm et al. .............. 53/374.8 |
| 4,024,692 | * | 5/1977 | Young et al. ................ 53/466 |
| 4,433,527 | * | 2/1984 | Ramsey ................... 156/583.1 |
| 4,869,051 | * | 9/1989 | Shifley et al. ............. 53/374.8 |
| 4,961,302 | * | 10/1990 | Davis ..................... 156/583.1 |
| 5,870,951 | | 2/1999 | Fragstein . |

* cited by examiner

Primary Examiner—John Sipos
(74) Attorney, Agent, or Firm—Bracewell & Patterson, L.L.P.

(57) ABSTRACT

A machine wraps packages such as bales of crumb rubber, or other containers of goods, into a protective synthetic resin film bag or cover. The machine is provided with a set of movable jaws each having a heat-sealing frame assembly having improved heat transfer characteristics. The heat-sealing frame assembly is composed of heat sealing units which have enhanced heat distribution and reduced cold spot or no-seal areas, and also reduced hot spot burn-through. Heat transfer from the heat sealing elements to the remaining portions of the baling assembly is also reduced.

17 Claims, 4 Drawing Sheets

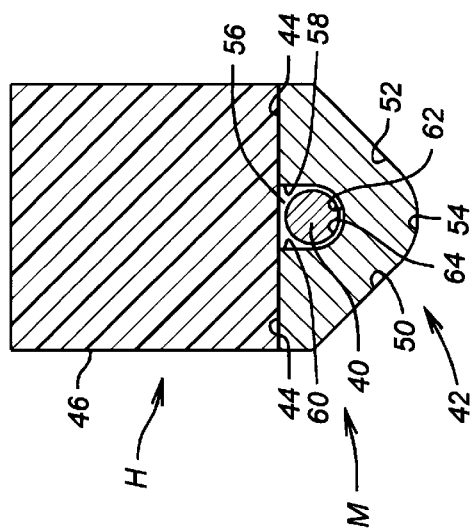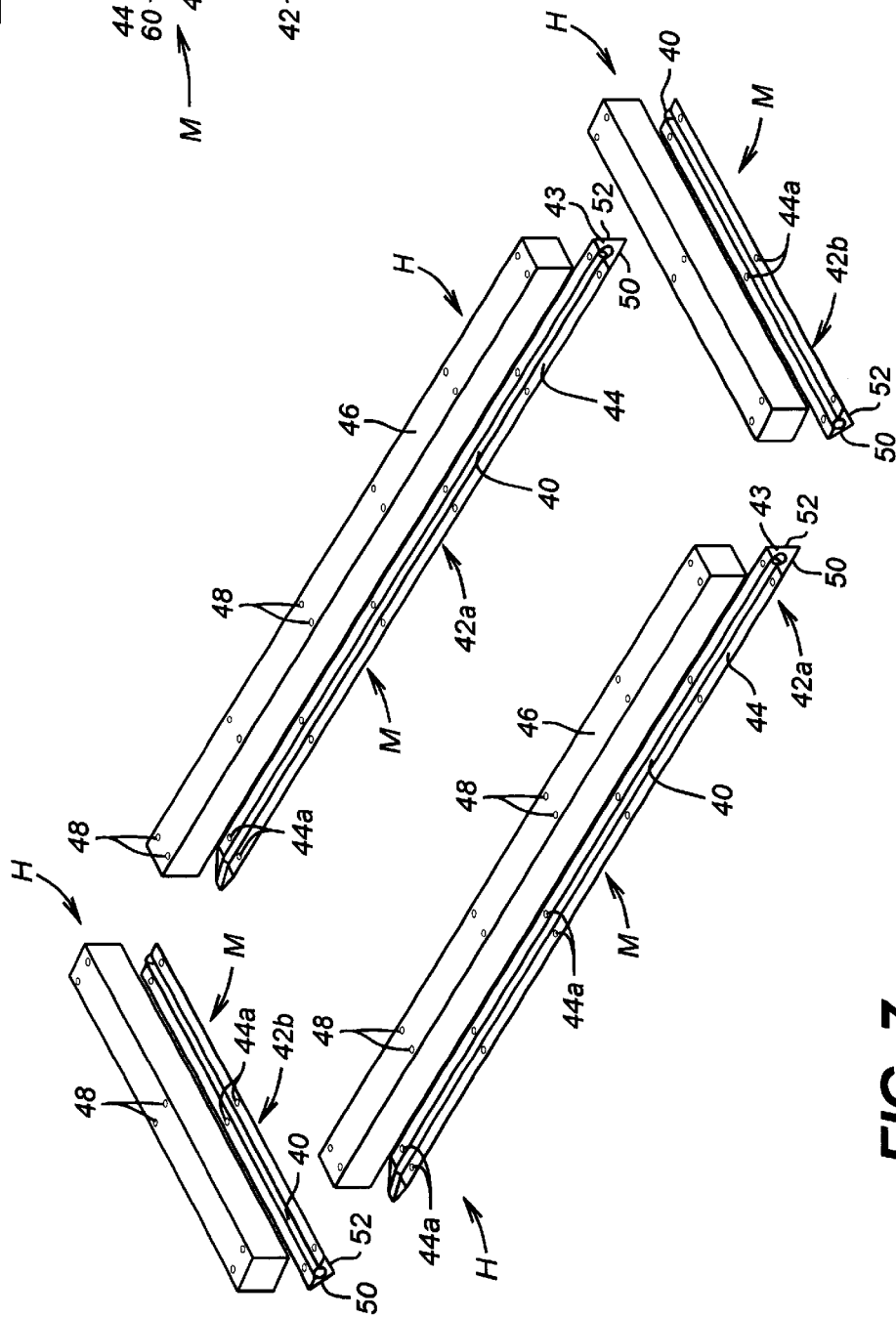

WRAPPING MACHINE WITH SEALING JAW ASSEMBLY FOR BALED PRODUCTS AND PACKAGES

BACKGROUND OF THE INVENTION

1. Field of the Invention

The present invention relates to sealing machines for bales or packages, such as high quality rubber crumbs or chips.

2. Description of the Related Art

A considerable number of types of packages or cartons are wrapped and then heat sealed into a protective synthetic resin film for shipment. So far as is known, the heat sealing has been done by a set of elongate heat elements formed in the horizontal outline or configuration of the package, usually a rectangle or square. An example of such an elongate heat element or rod is a product known as a Calrod® sold by General Electric Company. The rod received a flow of electrical current through it and generated heat to partially melt edges of the film together to seal the film into a protective film wrap over the box or product. The heat rod was usually enclosed in a non-adhesive protective cover, such as that sold by E. I. duPont de Nemours and Company under the trademark Teflon®, to prevent the film from sticking to heat element.

For example, high quality rubber is prepared in a process that forms small chips or clumps, often termed crumbs, of relatively soft, pliable rubber. The resultant rubber is typically referred to as crumb rubber. Examples of such types of crumb rubber are those provided under the trademarks Budene®, Natsyn® and Chemigum® of Goodyear Tire & Rubber Company. It has been typical to form the rubber crumbs into bales for ease of handling, storage and shipment. U.S. patent application Ser. No. 08/873,388, filed Jun. 11, 1997 now U.S. Pat. No. 5,870,951, of which applicant is the inventor, is one type of such a baling machine.

After the bale of rubber particles is formed, the bales are then wrapped within a protective synthetic resin film. The protective synthetic resin film prevented the relatively soft bales from sticking together when stacked for storage or shipment. The film wrapping also maintained the integrity of the bale during handling, storage and shipment. It was also desirable that this rubber after being made be kept free from contamination by metal particles, dirt, liquids, or other contaminants. The film wrapping was then heat sealed along seams about the rubber bale to enclose the rubber to prevent sticking, maintain integrity of the bale and also keep out contaminants. Typically, a set of heating element rods or blades in a sealing machine or press of the type described above gripped portions of the film and heated it to form a sealed seam.

There have, however, been problems with these heat sealing elements and assemblies. The temperature of the heat sealing assemblies fluctuated along their length, and in a non-uniform manner. Where the temperature was uneven along the heat sealing element, either cold spots or hot spots could result at certain locations. Where there were cold spots, the film edges of the seam often did not seal, or only partially sealed. This left openings along the seam where rubber or other package contents would be exposed and possibly adhere to adjacent bales or other objects or where contaminants might enter.

If the temperature of the heating elements was raised to avoid cold spots, the service life of the heating element was reduced because of increased temperature. Further, certain areas along the length of the heating elements could reach too high a temperature and cause hot spots. At hot spots, the heat could become high enough to burn holes through the film, again causing exposure of the contents with sticking problems and also the risk of contamination of the contents of the bale or package.

SUMMARY OF THE INVENTION

Briefly, the present invention provides a new and improved wrapping machine for wrapping a package into a synthetic resin film. The wrapping machine includes a set of sealing jaw members which receive between them a sleeve of the synthetic resin film. The package to be wrapped is moved or inserted into an open end of the synthetic resin film sleeve. The sealing jaw members are movable with respect to each other to enclose the package within the film sleeve.

Each of the movable jaw members of the machine has a heat sealing frame assembly mounted with it. The heat sealing frame assembly is formed of heat sealing units arranged in a shape conforming to the horizontal outline of the package.

The heat sealing units form seams in the synthetic resin film wrapping along side wall portions of the wrapping of the package. The heat sealing units include a heating element for heating the synthetic resin film to form the seams in the synthetic resin film wrapping. A heat sealing member is provided in the heat sealing unit for transferring heat from the heating element to portions of the film at the location of forming the seam. The heat sealing member is formed of a heat conductive material of a length corresponding to the seam to be formed. The heat sealing member also has a film contact strip extending along its length for contacting the synthetic resin film and heating it. An internal channel is formed in the heat sealing member for receiving the heating element. The heat sealing member is mounted with the wrapping machine by means of a mounting plate, which is preferably of an insulative material. By mounting the heating element in the heat conductive heat sealing member, the film contact strip is more uniformly heated, therefore eliminating hot or cold spots in the heating element.

BRIEF DESCRIPTION OF THE DRAWINGS

FIG. 7 is an exploded isometric view of a sealing jaw assembly for the sealing machine of FIG. 1; and FIG. 8 is a cross-sectional view taken along the line 8—8 of FIG. 1.

DETAILED DESCRIPTION OF INVENTION

Figure 1:
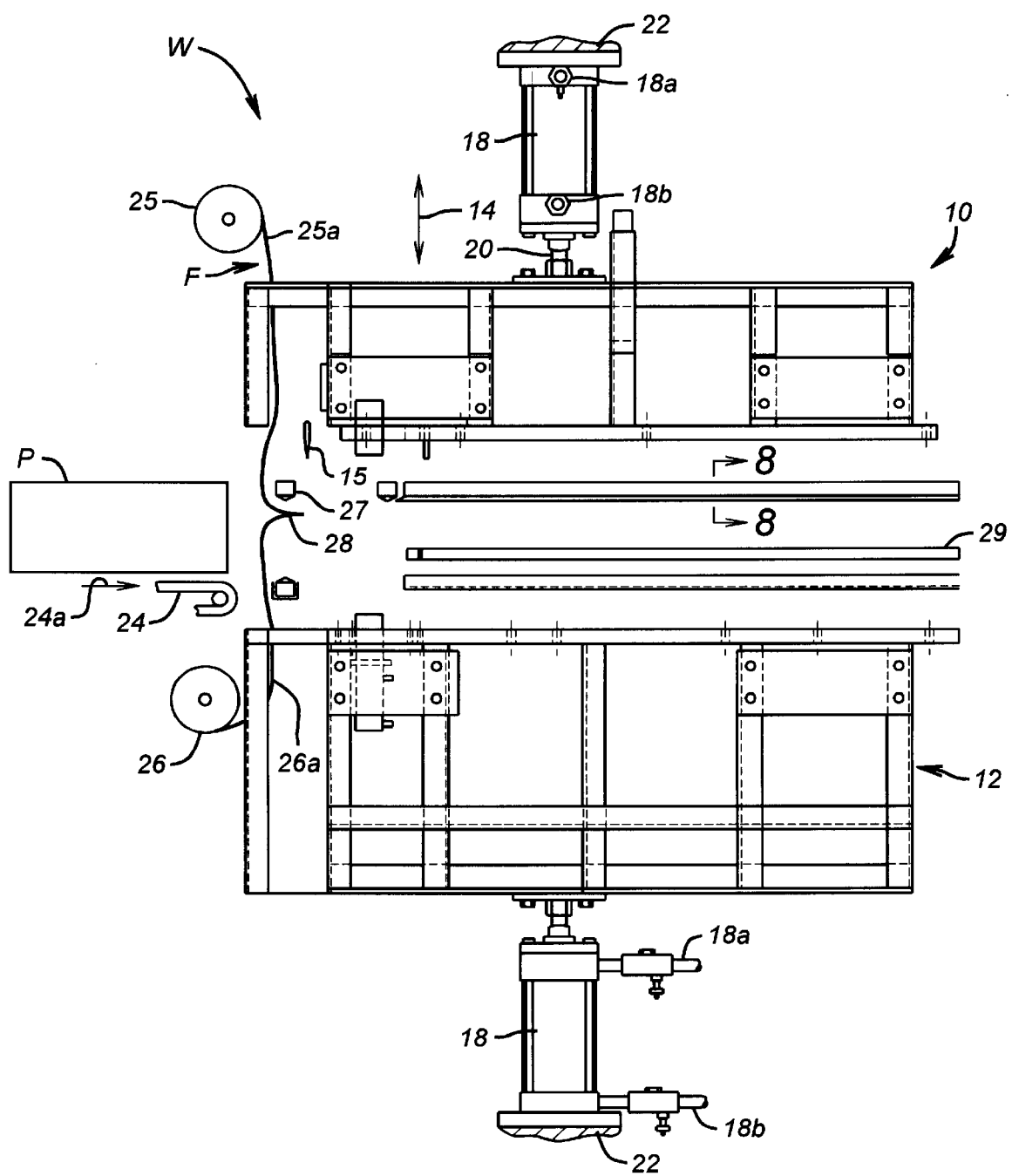
FIG. 1 is a side elevation view, partially exploded, of a sealing machine according to the present invention.
Figure 6:
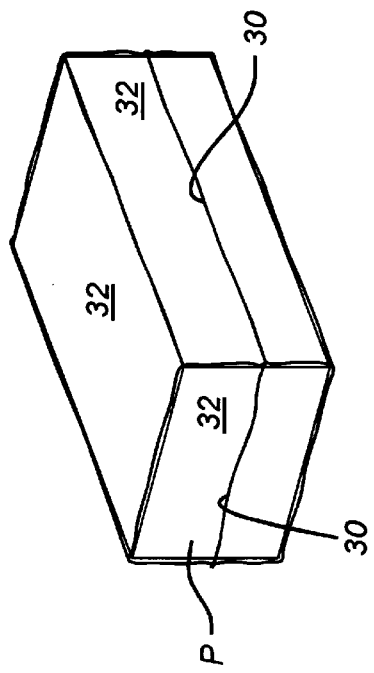
FIG. 6 is an isometric view of a bale sealed in a film wrapper by the sealing machine of FIG. 1.
Figure 5:
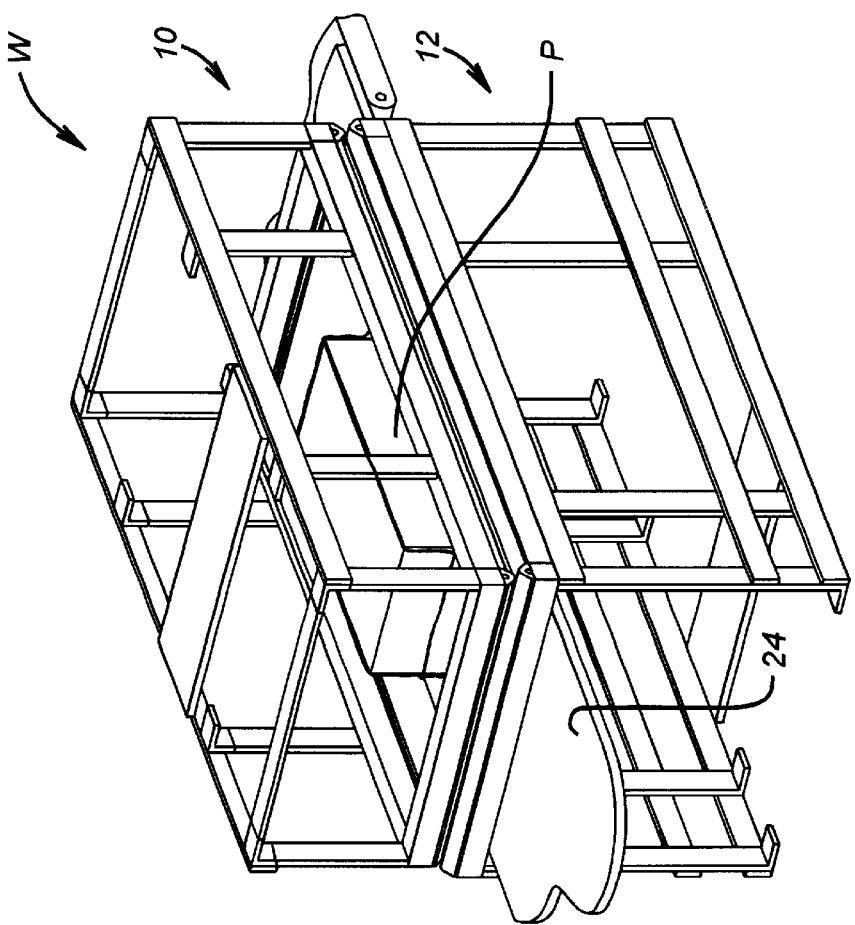
FIG. 5 is an isometric view of the sealing machine of FIG. 1 sealing a film wrapper about a rubber bale.

In the drawings, the letter W (FIGS. 1 and 5) designates generally a wrapping machine according to the present invention for wrapping a package P (FIG. 6) into a synthetic resin film F. The wrapping machine W includes a set of jaw members 10 and 12 which in the preferred embodiment are movable support frames. The jaw or frame members 10 and 12 are movable inwardly and outwardly with respect to each other, as indicated by an arrow 14, by a suitable movement mechanism. As shown in the drawing, the movement mechanism for each of the jaw members 10 and 12 may be a hydraulic or pneumatic cylinder 18 mounted with such jaw member. It should be understood that other forms of mechanisms conventional in the art may also be used as movement mechanisms as well.

The cylinder 18 for each such jaw member receives a flow of driving fluid through suitably positioned fluid supply flow ports 18a and 18b. The fluid is received into one of the ports 18a or 18b and pressurized to drive a piston rod 20 to cause movement of the jaw member 10 or 12, as the case may be, in one direction. Similarly, pressurized fluid received into the other of the ports reverses the direction of movement of the jaw member. The movement mechanisms 18 are anchored or affixed as indicated schematically at 22 to some base, floor, or other immobile frame work or structure.

The particular structural arrangement of beams, channels and other structural components of the jaw members 10 and 12 is conventional and may include limit switches or position sensors to control relative amounts of their movement with respect to each other. A suitable source for such jaw or frame members 10 and 12, for example, is J & J Manufacturing Co. of Beaumont, Tex. It should be understood that movable support frames available from other suppliers may also be used.

In the preferred embodiment, the package P is shown as a bale of crumb rubber, typically weighing about eighty pounds and having horizontal cross-sectional dimensions of fourteen inches by twenty-three inches and a height of about ten inches. When produced, the crumb rubber is typically formed into bales, of this type, for ease of handling, storage and shipment. U.S. patent application Ser. No. 08/873,388, filed Jun. 11, 1997 now U.S. Pat. No. 5,870,951, and of which Applicant is the inventor, is a suitable type of machine for forming crumb rubber into such a bale. Such patent is incorporated herein by reference for all purposes.

The crumb rubber in such a bale is relatively pliable and adhesive. For this reason, it is desirable to encapsulate the crumb rubber bale or package P to a relatively snugly fitted seamed package (FIG. 4) of the synthetic resin film F. As will be set forth, the relative snugness of the fit can be adjusted to a suitable fit. Further, although the preferred embodiment is in the context of a crumb rubber package or bale, it should be understood that other types of packages could also be wrapped, such as food products, frozen food, or any other suitable type of package which is desirable to be wrapped and heat-sealed into a protective synthetic resin film F for shipment.

The package P is transported into position next to the jaw members 10 and 12 on a conveyor belt 24. Portions of the conveyor belt 24 are not shown in FIG. 1 in order that structure of the wrapping machine W may be more clearly seen. The film F for wrapping the package P is initially contained as two separate sheets 25a and 26a, stored on spaced upper storage roll 25 and lower storage roll 26. The film sheets 25a and 26a from the rolls 25 and 26 are fused together by a front or lead heating element 27 into a lateral seam 28 extending transversely to the direction of movement, indicated at 24a, of the package P along conveyor belt 24.

Figure 2:
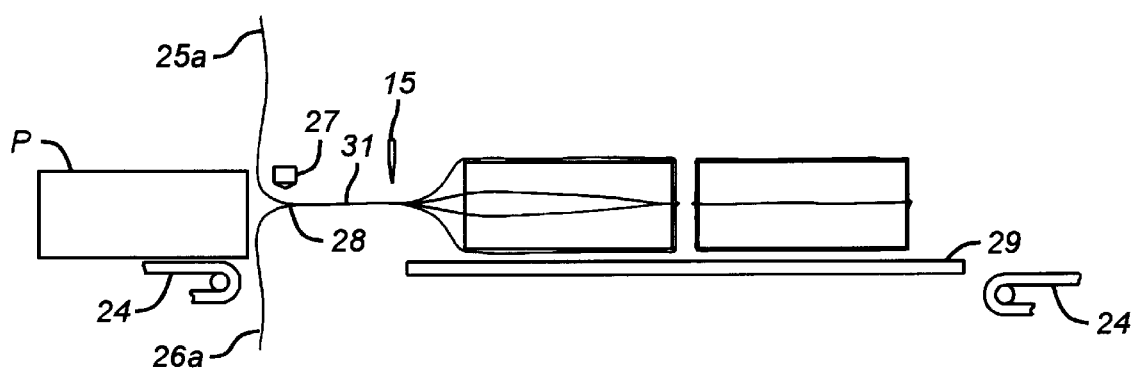
FIGS. 2, 3 and 4 schematic views of portions of the sealing machine of FIG. 1 during its operation.
Figure 3:
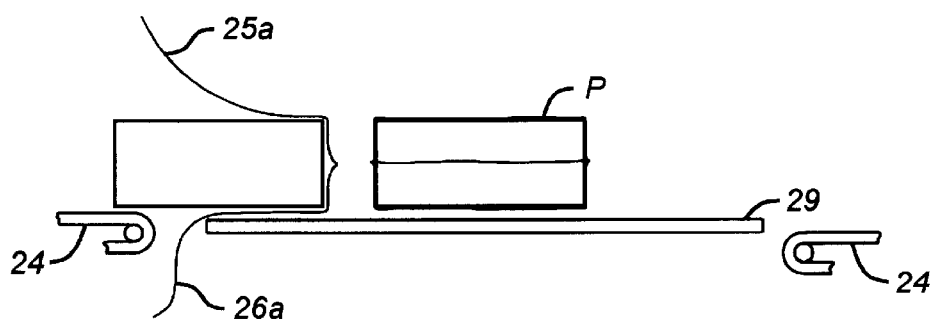

The leading portion of package P contacts the seam 28 (FIG. 2) and moves along with the film sheets 25a and 26a into position for wrapping in the machine W. A heat resistant, non-adhesive cushion 29 is located between the jaw members 10 and 12 for receipt of the package P. The cushion 29 is preferably fixedly mounted on machine W with respect to the movable jaw members 10 and 12. The package P to be wrapped moves from the conveyor belt 24 into place on the cushion 29 for sealing. As the package P to be wrapped moves, it engages (FIG. 3) the package P wrapped and sealed during the previous cycle and moves it away for subsequent handling, storage or transport P. Depending on the size of machine W and cushion 29, one or more previously wrapped packages may be present on cushion 29 in a sequence at this time.

Figure 4:
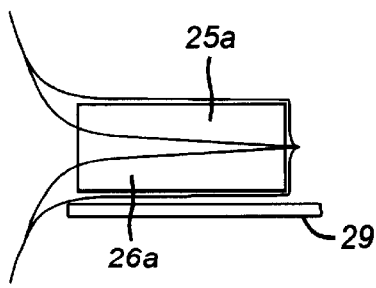

The package P to be wrapped moves from the conveyor belt 24 along with the film F into position in the machine W along with the film sheets 24a and 26a until the package P is in proper position for wrapping (FIG. 4). The detection of position of package P is done in the conventional manner by photodetectors or other sensors. The jaw members 10 and 12 are then movable inwardly once the package P to be wrapped is sensed as being in the proper position on the cushion 29.

According to the present invention, each of the jaw members 10 and 12 is provided with a heat sealing frame assembly A for forming seams 30 in the protective cover or wrapping formed from the synthetic resin film. The seams 30 (FIG. 6) are formed along side and rear walls 32 about the package P. When the package P is in proper position for wrapping (FIG. 4), the jaw members 10 and 12 move inwardly to enclose (FIG. 5) the package P within the heat sealing frame assembly A.

The heat sealing frame assembly A (FIGS. 7 and 8) for each of members 10 and 12 is composed of a number of heat sealing apparatus or units H mounted to such member. When the bale B is in proper position (FIG. 5) the moveable frame members 10 and 12 with their heat frame assemblies H move together to form a seal about the sides of the bale B. Heat frame assemblies are provided for at least the two side walls and rear wall 32 in a general U-shape. If desired, a fourth or front heat frame assembly H may also be provided. The heat sealing units H are connected together to conform an outline to the shape of the package P. Typically, the package P is rectangular or square in horizontal cross-section and the frame assembly A, whether U-shaped or box-shaped with a fourth element as shown, is of a corresponding rectangular or square configuration.

Each of the heat sealing apparatus or assemblies H includes a heating element 40 in the form of an elongate electrical heating rod, such as of the type mentioned above sold by General Electric Company under the trademark CALROD®. The length of each of the heating elements 40 is determined by the dimensions of the side walls of the package P to be wrapped in the machine W. The heating element 40 is connected in a conventional manner to a suitable source of electrical current at each end outwardly from the unit and on flow of such current generates heat along its length. If desired, the front or lead heating element 27 may be formed of a similar construction to the heat sealing assembly H.

The heat sealing element 40 is mounted in a heat sealing member M according to the present invention for transferring heat to side wall portions 32 of the film F at the locations where the seams 30 are to be formed. The heat sealing member M is an elongate bar or rod 42 mounted along a generally flat rear base surface 44 to a mounting plate 46 by screw, or bolts 48 or other suitable fasteners. The screws 48 are connected into receptor sockets 44a formed in the base surface 44.

Each heat sealing bar or element 42 in assembly A is also drilled and tapped as indicated at a number of receptor sockets 44a at a number of suitably spaced locations. The receptor sockets 44a receive bolts or other suitable connectors for connection of the heat sealing bars 42 of heat sealing frame assembly A to one of the moveable jaw members 10 and 12.

The rear base surface 44 is, for example, one inch or so wide. The mounting plate 46 is preferably of a heat insulative material, such as a fiberglass adapted for high heat conditions. A suitable such material is Green Core Series 500. In this manner, heat transfer from the heat sealing element 40 and the heat sealing rod or bar 42 to the wrapping structure, as well as jaw members 10 and 12, is substantially reduced and the remaining portions of the machine W are also not recipients of such heat. The mounting plates 46 are mounted to one of the jaw members 10 or 12 by screws, bolts or other suitable fasteners.

The heat sealing bar members 42 are preferably formed by any suitable metal forming technique of a single unitary piece of heat conductive material, such as a lightweight metal, preferably aluminum for cost and weight reasons. The use of lightweight aluminum in the bar members 42 also reduces weight of the sealing assembly for ease in handling. The elongate heat sealing bars 42 have side walls 50 and 52 tapering inwardly from lower side walls 51 and 53, respectively. The lower walls 51 and 53 extend vertically a slight distance, such as one-eighth inch from the base surface 44.

A film contact strip portion 54 is formed between the innermost portions of side walls 50 and 52. The film contact strip portion 54 is an arcuate or curved surface of about one-quarter inch radius extending between the side wall members 50 and 52 along the length of the heating element bar 42. The arcuate film contact surface 54 is adapted to engage a corresponding oppositely faced film contact strip portion or the other jaw member. If desired, the film contact strip portion 52 may be provided with a suitable non-adhesive coating by tape, spraying, deposit or other technique. A suitable non-adhesive coating, for example, is a commercially available tape of Teflon® or comparable material containing glass particles such as that sold as 3M5488 by 3M Company.

When the jaw members 10 and 12 are brought together, the oppositely facing film contact strip portions 54 engage each other adjacent the side walls of the package P between them. Lateral spacing between the heat sealing elements 42 and the side walls of the package may be adjusted to vary the snugness of the wrap to be formed over the package P.

Flow of electrical current through the heat sealing element 40 is transferred through the heat sealing bar 42 to heat portions of the film located between the film contact strip portions 54. The film contact strip portions 54 fuse the wall portions 30 of the resin film together, forming the seams 32 and causing a snugly fitted synthetic film resin wrapping to be placed onto the package P. Portions of the film F external to the seams 32 and outside the heating elements are separated from the wrapping during the sealing operation. These excess side portions of the film F which are not part of the wrapping separate and fall away from the package P. The arcuate surface of the contact strip portions and their junction with side walls 50 and 52 provides a wider, more uniform seal. The non-adhesive coating on strip 52 reduces any tendency of the film to adhere to the contact strips 54 of heat sealing bar 42.

The heat sealing bar 42 has an internal channel 56 formed extending approximately one-quarter inch inwardly from the base surface 44 along a pair of spaced side walls 58 and 60 to a lower surface 62. The lower surface 62 is of a shape conforming to the outer surface of the heat sealing element. Where, as shown, the heat sealing element 40 is a cylindrical rod having a curved outer surface 64, the lower surface 62 of the internal channel 56 is a curved surface. If the heat sealing element 40 were rectangular in configuration, the lower surface 62 of the internal channel 56 could be a correspondingly flat surface, if desired.

The sealing bars 42, whether three in a U-shape, or four in a box shape are assembled into a generally rectangular framework according to the configuration of the package P. Each such frame thus includes a set of longitudinally extending bars 42a and either one or two transversely extending end bars 42b. The bars 42a are located to extend in the direction of movement of the conveyor belt 24. The end bars 42b extend transversely to the conveyor belt 24 between opposite ends of the bars 42a. As previously mentioned, the front sealing bar 42b adjacent the front lateral seam 28 is optional. End portions 43 (FIG. 7) of the bars 42a at each end are mitered to have a surface conforming to the angle of tapered side walls 50 and 52 of end bars 42b. The mitered end portions 43 permit the heat sealing members M to form a continuous, uninterrupted heated surface about the package P for contact with the film F, even at corner portions and ends.

The base surface 44 of the heat sealing member M and the mounting plate 46 are co-extensive, forming a heat boundary surface above the heat sealing members 42. The mounting plate 46 thus serves as a closure surface for the internal channel 56 and confines the flow of heat from the heating sealing element 40 effectively into the heat conductive body of heat sealing bars 42.

The heat sealing bars 42 function as heat sinks for heat from the rod 40 due to the presence of the insulative mounting plate 46. The unitary structure of the heat sealing bar 42 distributes the heat substantially uniformly over its volume, because of its being integrally formed from a single conductive element. With the bar member 42 being solid unitary bodies, compensation is provided for any tendency that might occur of the heating rod 40 to generate hot spots or cold spots along its length. If a hot spot develops in the rod 40, the mass of the unitary body of bar 42 provides temperature distribution and averaging functions, tending to alleviate any potential hot spots. The unitary structure of the heat sealing bars 42 prevents the harmful effects of such hot or cold spots in formation of seals along the seams of the package.

Similarly, portions of the bar member 42 adjacent any areas of the rod 40 that may be cold spots are drawn to a composite higher temperature by the remaining heated mass of other portions the bar member 42. The presence of the heat sealing bar 42 thus reduces any tendency for cold spots to occur in sealing. This also allows the heating element 40 to be operated at lower operating temperatures and still form proper seals in the film F. The lower operating temperatures for the heating element 40 extend its service life.

As is conventional, at least one of the jaw members 10 and 12 is provided with a knife or other suitable cutter assembly 15. The cutter assembly or assemblies 15 are spaced laterally from each other transverse the path of movement of the package P. The cutter assemblies 15 are used to cut the surplus tail portion 31 of the resin film F at its rearwardly of package P, but forward of lead sealing element 27. The laterally extending heat sealing element H at the rear seam 30 of the package senses the forward end of the tail portion 31. At the same time, as previously mentioned, the front or lead heating element 27 forms a new lateral seam 28 between the film sheets from rolls 25 and 26 from the next bale B to be wrapped.

The foregoing disclosure and description of the invention are illustrative and explanatory thereof, and various changes in the details of the illustrated apparatus and construction and method of operation may be made without departing from the spirit of the invention.

What is claimed is:

1. A heat sealing apparatus fusing adjacent wall portions of a synthetic resin film sleeve together and forming a seam for a heat sealed, fitted synthetic film wrapping of a package in a wrapping machine comprising:
    opposing sealing apparatus to seal said film wall portions together, each of said apparatus comprising:
        a heating element for heating the synthetic resin film;
        a heat sealing member for transferring heat from the heating element to portions of the film at the location of forming the seam;
        the heat sealing member being formed of a heat conductive material of a length corresponding to the seam to be formed;
        the heat sealing member having a film contact strip extending along its length for contacting the synthetic resin film and heating it;
        the film contact strip of the heat sealing member comprising an arcuate surface extending between the tapering side walls and contacting one of the adjacent wall portions of the film sleeve and engaging the other of the adjacent wall portions of the sleeve and its associated heat sealing member film contact strip arcuate surface and transferring heat from the heating element to the film to fuse the adjacent wall portions of the sleeve together and form the seam;
        the heat sealing member having an internal channel formed in it for receiving the heating element;
        a mounting plate for mounting the heat sealing member to the wrapping machine;
        the heat sealing member having a base surface for mounting with the mounting plate;
        the heat sealing member including two inwardly tapering side walls extending from the base surface to the film contact strip;
        the mounting plate having a mounting surface co-extensive with the heating sealing member base surface; and
        the mounting plate being formed of a heat insulative material to confine the flow of heat from the heating element into the heat sealing member.

2. The apparatus of claim 1, wherein:
    the internal channel of the heat sealing member is formed extending inwardly from the heat sealing member base surface.

3. The apparatus of claim 2, wherein:
    the heat sealing member has a pair of spaced walls extending inwardly from the heat sealing member base surface to a lower surface to define the internal channel.

4. The apparatus of claim 3, wherein the heating element is a heating rod and the lower surface of the internal channel conforms to the shape of the heating rod.

5. The apparatus of claim 4, wherein the heating element is a heating rod with a cylindrical outer surface and wherein the lower surface of the internal channel conforms to the cylindrical outer surface of the heating rod.

6. The apparatus of claim 1, wherein the mounting plate forms a closure for the internal channel in the heat sealing member.

7. The apparatus of claim 1, wherein the heat sealing element is formed of a lightweight metal.

8. The apparatus of claim 1, wherein the heat sealing element is formed of aluminum.

9. A heat sealing frame assembly fusing adjacent wall portions of synthetic resin film sleeve together and forming a seam for a heat sealed, fitted synthetic film wrapping of a package in a wrapping machine, comprising:
    a plurality of opposing heat sealing apparatus, one pair for each of the seamed walls to be formed in the synthetic resin film wrapping, each of the heat sealing apparatus comprising:
    a heating element for heating the synthetic resin film;
        a heat sealing member for transferring heat from the heating element to portions of the film at the location of forming the seam;
        the heat sealing member being formed of a heat conductive material of a length corresponding to the seam to be formed;
        the heat sealing member having a film contact strip extending along its length for contacting the synthetic resin film and heating it;
        the film contact strip of the heat sealing member comprising an arcuate surface extending between the tapering side walls and contacting one of the adjacent wall portions of the film and engaging the other of the adjacent wall portions of the sleeve and its associated heat sealing member film contact strip arcuate surface and transferring heat from the heating element to the film to fuse the adjacent wall portions of the sleeve together and form the seam;
        the heat sealing member having an internal channel formed in it for receiving the heating element;
        a mounting plate for mounting the heat sealing member to the wrapping machine;
        the heat sealing member having a base surface for mounting with the mounting plate;
        the heat sealing member including two inwardly tapering side walls extending from the base surface to the film contact strip;
        the mounting plate having a mounting surface co-extensive with the heating sealing member base surface; and
        the mounting plate being formed of a heat insulative material to confine the flow of heat from the heating element into the heat sealing member.

10. The heat sealing frame assembly of claim 9, wherein the heat sealing apparatus are connected together to conform in outline to a horizontal cross-section of the package.

11. The heat sealing frame assembly of claim 10, wherein the heat sealing apparatus are connected into a rectangular unit.

12. A wrapping machine for wrapping a package into a heat sealed, fitted synthetic resin film wrapping from a sleeve of synthetic film having adjacent side wall portions which are fused together to form seams of the wrapping, comprising:
    a first jaw member;
    a second jaw member;
    the first and second jaw members receiving between them a sleeve of the synthetic resin film having the package inserted therein, and being movable to enclose the package within the synthetic resin film sleeve;
    each of the first and second jaw members having mounted therewith a heat sealing frame assembly, comprising:
        a heating element for heating the synthetic resin film;
        a heat sealing member for transferring heat from the heating element to portions of the film at the location of forming the seam;

the heat sealing member being formed of a heat conductive material of a length corresponding to the seam to be formed;

the heat sealing member having a film contact strip extending along its length for contacting the synthetic resin film and heating it;

the film contact strip of the heat sealing member comprising an arcuate surface extending between the tapering side walls and contacting one of the adjacent wall portions of the film and engaging the other of the adjacent wall portions of the sleeve and its associated heat sealing member film contact strip arcuate surface and transferring heat from the heating element to the film to fuse the adjacent wall portions of the sleeve together and form the seam;

the heat sealing member having an internal channel formed in it for receiving the heating element;

a mounting plate for mounting the heat sealing member to the wrapping machine; and the film contact strips of the heat sealing members of the heat sealing frame assemblies facing each other and being adapted to engage each other and contact portions of the synthetic resin film sleeve to form wall seams in the synthetic resin film wrapping;

the heat sealing member having a base surface for mounting with the mounting plate;

the heat sealing member including two inwardly tapering side walls extending from the base surface to the film contact strip;

the mounting plate having a mounting surface co-extensive with the heating sealing member base surface; and the mounting plate being formed of a heat insulative material to confine the flow of heat from the heating element into the heat sealing member.

13. The wrapping machine of claim 12, including the arcuate surfaces of the film contact strips of the heat sealing members having a non-adhesive coating formed thereon.

14. The apparatus of claim 1, wherein the film contact strip portion arcuate surface has a non-adhesive coating formed thereon.

15. The apparatus of claim 1, wherein the film contact strip portion arcuate surface has a radius of about one-quarter inch.

16. The heating sealing frame assembly of claim 9, wherein the film contact strip portion arcuate surface has a non-adhesive coating formed thereon.

17. The heat sealing frame assembly of claim 9, wherein the film contact strip portion arcuate surface has a radius of about one-quarter inch.

* * * * *